United States Patent
Baum et al.

[11] Patent Number: 5,593,196
[45] Date of Patent: Jan. 14, 1997

[54] TELESCOPIC HOT STICK

[75] Inventors: Larry R. Baum, Hastings; Gary L. James, Middleville; Mark A. Schmidt, Hastings, all of Mich.

[73] Assignee: Hastings Fiber Glass Products, Inc., Hastings, Mich.

[21] Appl. No.: 346,008

[22] Filed: Nov. 29, 1994

[51] Int. Cl.⁶ ................................................ F16B 7/10
[52] U.S. Cl. ................ 294/19.1; 81/53.1; 403/109; 403/328
[58] Field of Search .................. 294/19.1, 19.2; 403/109, 328, 377, 378, 379; 81/53.1, 53.11, 53.12

[56] References Cited

U.S. PATENT DOCUMENTS

| 942,490 | 12/1909 | Dunn | 403/378 |
|---|---|---|---|
| 2,165,967 | 7/1939 | Haupt | 403/109 |
| 2,319,992 | 5/1943 | Hubbard | 294/19.1 |
| 3,182,960 | 5/1965 | French | 294/19.1 |
| 3,474,833 | 10/1969 | Garrette, Jr. et al. | 294/19.1 |
| 3,860,350 | 1/1975 | Rogers | 403/377 |
| 4,047,821 | 9/1977 | Hoke et al. | 403/109 |
| 4,079,978 | 3/1978 | McMullin | 294/19.1 |
| 4,080,080 | 3/1978 | Cisler | 403/378 |
| 5,004,203 | 4/1991 | Fabius | 403/109 |
| 5,171,052 | 12/1992 | Cunningham | 294/19.1 |
| 5,387,048 | 2/1995 | Kuo | 403/328 |

*Primary Examiner*—Dean Kramer
*Attorney, Agent, or Firm*—Flynn, Thiel, Boutell & Tanis, P.C.

[57] ABSTRACT

A telescopic hot stick or pole for manipulating a tool from a position a selected distance away from a workpiece wherein the hot stick includes a tubular first section having a female end and a predetermined non-circular cross-sectional shape. A second section has a male end slidably engaged within the first tubular section and a predetermined non-circular cross-sectional shape conforming in a close-fit relation to the shape of the first section to prevent significant relative rotation of the second section therein. A locking assembly maintains the second section in an extended position where locking is accomplished in response to a sliding of the second section to the extended position and may be disengaged to permit ready removal of the second section from the first section.

20 Claims, 2 Drawing Sheets

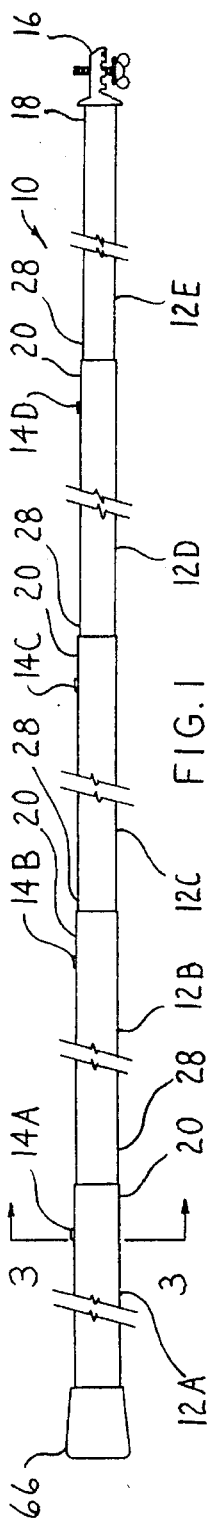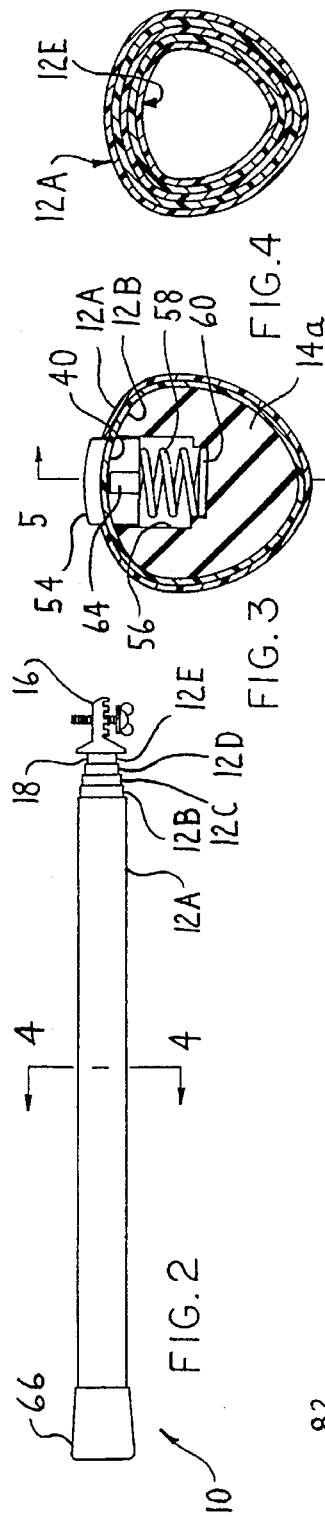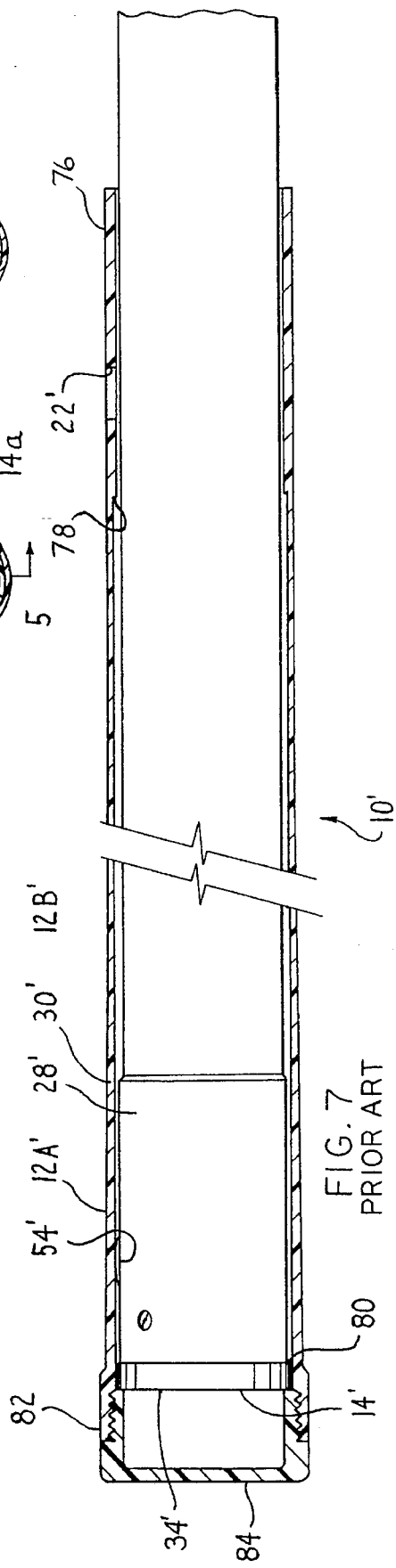

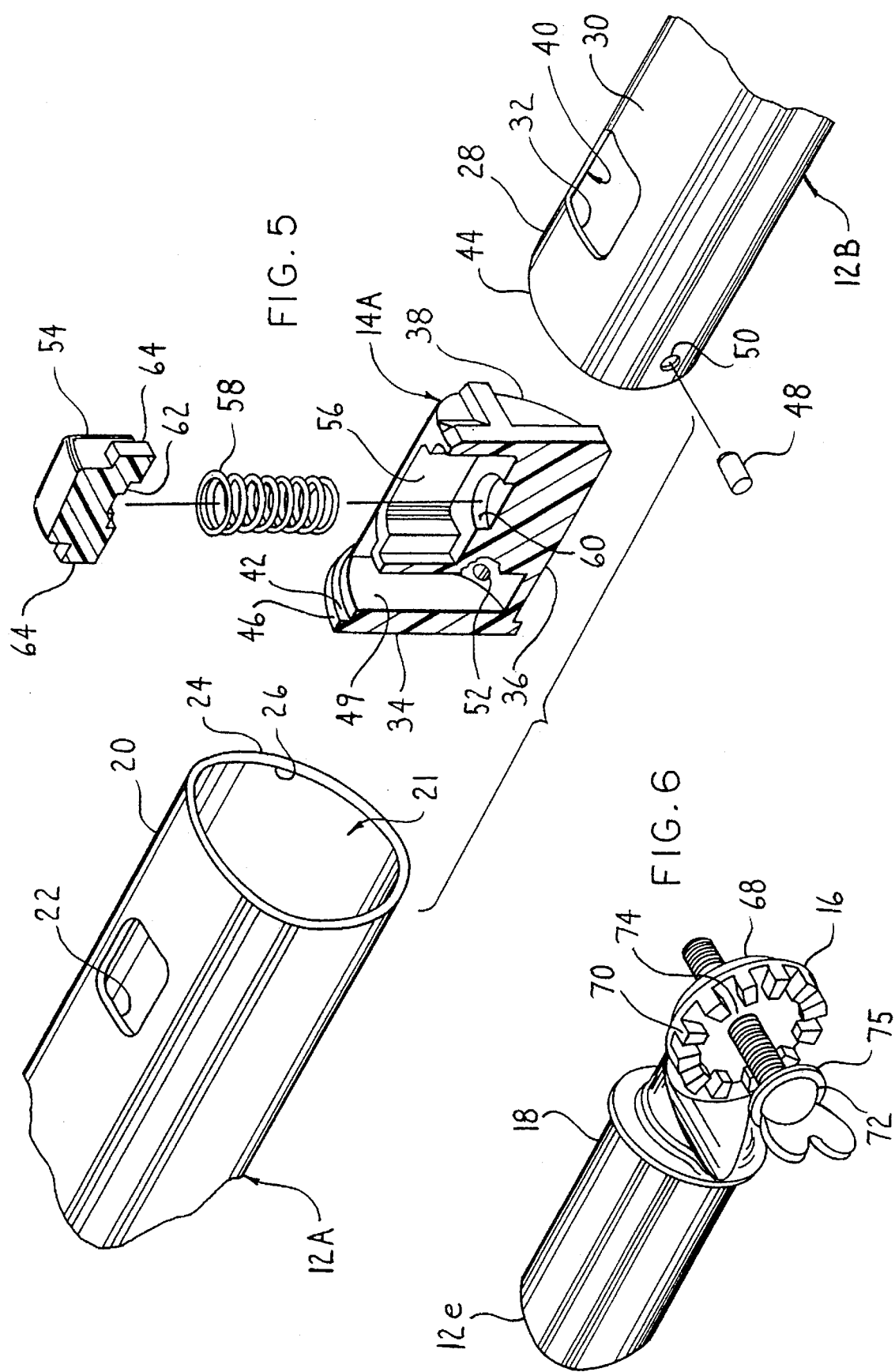

TELESCOPIC HOT STICK

FIELD OF THE INVENTION

The invention generally relates to a telescopic pole commonly referred to as a "hot stick" for manipulating a tool from a position a selected distance away from a workpiece and, more particularly, to a dielectric pole having plural telescopic sections with non-circular cross-sectional shapes to prevent relative rotation therebetween and which each are lockable into an extended position in response to a sliding of one section with respect to another adjacent section and which each are readily removable upon disengagement of a locking assembly.

BACKGROUND OF THE INVENTION

Telescopic hot sticks are typically used in a high voltage electrical environment as well as other environments where a long reach is needed to access a workpiece located at a remote location, such as on a power pole or the like. Hot sticks are typically constructed of a suitable dielectric material and include a tool holder at an extremity thereof. The tool holder is adaptable to engage a wide array of different tools or the like.

This arrangement allows a user to perform a wide variety of tasks such as opening and closing various types of switches, replacing fuses, pruning tree limbs or replacing lamps in street circuits and rooms with high ceilings. Since the workpiece may be as far as 30 feet or more away from a user, telescoping hot sticks or poles provide a variable length to accommodate these tasks.

An example of a known hot stick is constructed of multiple sections of telescoping tubing which are provided with a circular cross-sectional shape. The first section of two adjacent sections includes an aperture at a female end thereof. A male end of an adjacent second section is slidingly engaged within the female end and includes a button assembly which engages the aperture of the first section when the second section is in an extended position.

To prevent unwanted removal of the second section from the first section and facilitate engagement of the button assembly with the aperture, the first section has a reduced diameter portion at the female end. The reduced diameter portion forms an interior annular rim therein while the button assembly of the second section includes an end wall which forms an outer annular flange. The outer annular flange engages the interior annular rim of the first section to prevent unwanted removal of the second section from the female end. Such an arrangement also facilitates engagement of the button assembly with the aperture whereupon the second section is slid until the outer annular flange abuts against the interior annular rim and then is rotated until a button of the button assembly is in registry with and engages or is received in the aperture of the first section.

Construction of such an arrangement requires inserting the second section through an open end of the first section opposite the female end. To prevent the second section from falling out of the open end, an end cap is required or, in the case of intermediate sections of the pole, securing of the button assembly is required. As a result, assembly of the sections together is done in sequence from smallest diameter section to largest.

While such an arrangement provides the desired telescoping function, locking one section in the extended position requires the acts of both sliding and rotating the section being locked. In addition, the overall length of the hot stick may not be easily varied due to a requirement that either the end cap or the button assembly be removed from an end of a section which may require tools or the like unavailable at the work site.

It is desirable, therefore, to provide a telescoping hot stick which permits ready locking of one section with respect to another section by a simple sliding movement. It is further desirable to be able to vary the maximum overall length and to provide for ready removal of one section with respect to another without having to disassemble any component parts.

SUMMARY OF THE INVENTION

The invention is a telescoping hot stick or pole for manipulating a tool from a position a selected distance away from a workpiece where an extremity of the pole includes a tool holder. The hot stick of the invention includes a tubular first section having a female end and a predetermined non-circular cross-sectional shape. A second section is provided having a male end slidably engaged within the first tubular section through the female end thereof. The second section has a predetermined non-circular cross-sectional shape corresponding to the shape of the first section to prevent rotation of the second section.

A locking assembly is provided in the male end to engage the female end of the first section and maintain the second section in an extended position. Locking is readily accomplished by sliding the second section to the extended position whereupon a button of the locking assembly becomes received in an aperture in the first section. The button is further movable to a depressed position from the aperture which permits sliding of the second section either into the first section to collapse the hot stick or out to remove the end section therefrom. As a result, the second section may be locked in the extended position by simple sliding and then may be removed by depressing the lock button and sliding the second section out.

BRIEF DESCRIPTION OF THE DRAWINGS

FIG. 1 is a broken front elevational view of the telescoping hot stick of the invention illustrated in the fully extended position;

FIG. 2 is a broken front elevational view of the telescoping hot stick illustrating a plurality of sections collapsed one within the other;

FIG. 3 is a sectional view of cooperating male and female ends of adjacent sections and of a locking assembly illustrated in engagement as viewed in the direction of arrows 3—3 of FIG. 1;

FIG. 4 is a side sectional view of the sections collapsed one within the other as viewed in the direction of arrows 4—4 of FIG. 2;

FIG. 5 is an exploded partial perspective view of the male and female ends of adjacent sections and an exploded sectional view of a locking assembly therebetween as viewed in the direction of arrows 5—5 of FIG. 3;

FIG. 6 is a partial perspective view of an extremity of the telescoping hot stick illustrating a tool holder; and FIG. 7 is an enlarged front elevational view of a prior art telescoping pole illustrating a second section slidably engaged within a first section depicted in cross-section.

DETAILED DESCRIPTION

Referring to FIG. 1, the telescopic hot stick or pole of the invention is generally designated by reference numeral 10.

The telescoping hot stick 10 includes a predetermined number of similar length, tubular sections 12, i.e. 12A–12E, slidably engaged one with the other which provide a variable length for the hot stick 10, a corresponding number of locking assemblies 14, i.e. 14A–14D, provided between each adjacent section 12 for securing the adjacent sections 12 in extended engagement, and a tool holder 16 at an extremity 18 thereof. To shorten the overall length of the hot stick 10, each section 12 is readily removable as described herein.

More particularly, to provide telescoping engagement of the sections 12A–12E, the sections 12A–12E are provided with progressively decreasing cross-sectional dimensions as illustrated in FIG. 4 wherein the first section 12A has the largest cross-sectional dimension and last section 12E has the smallest cross-sectional dimension. The sections 12 are tubular and have a close-fit slidingly engaged relation one with the other so that the sections will remain coaxial with little or no detectable relative movement therebetween when in the extended relation.

To prevent relative rotation between the sections 12, sections 12 are formed with a predetermined non-circular cross-sectional shape. Preferably, this shape is substantially triangular as illustrated in FIG. 4 so as to have three side surfaces with a convex arcuate corner portion disposed between each mutually adjacent pair of side surfaces. It should be recognized that other non-circular shapes may be used, so long as rotation of one section 12 relative to an adjacent section 12 is prevented and sliding engagement is permitted.

The cross-sectional shape should be uniform along the axial length of each section 12 to facilitate assembly and disassembly of the hot stick 10. In other words, there should be no physical constructions which would impede sliding engagement of adjacent sections 12, e.g. 12A and 12B; 12B and 12C; etc.

The particular length of each section 12A–12E and the total quantity of sections 12 comprising each pole 10 can vary depending upon the overall total length required for the pole 10. It should be recognized that any combination of lengths and quantity may be used to provide the desired length and satisfy the intended uses of the pole 10.

The sections 12A–12E are constructed of any suitable material which provides the desired strength, color stability and dielectric properties. The preferred material is a reinforced high density electrical grade fiber glass laminate with which a skilled artisan would be familiar.

As seen in FIG. 1, adjacent sections 12, i.e. 12A and 12B, 12B and 12C, etc., are maintained in extended engagement by the particular locking assembly 14 associated therewith. To illustrate the cooperating engagement of these structures, the specific construction of representative sections 12A and 12B is described as illustrated in FIGS. 3 and 5. It should be recognized, however, that a similar construction is utilized with respect to the engagement of the other adjacent sections 12B–12E illustrated in FIG. 1.

Referring to FIG. 5, the larger first section 12A includes adjacent a female end 20, defined by an opening 21, an aperture 22 therethrough in one surface of the non-circular form. To prevent rotation and facilitate gripping of the outer periphery 24 of the section 12A by the user, the outer periphery 24 as well as an inner periphery 26 of section 12A are formed with the substantially same triangular cross-sectional shape.

To permit sliding engagement of the section 12B within the adjacent section 12A, the section 12B has a male end 28 which has an outer periphery 30 conforming in a close-fit relation to the inner periphery 26 of the female end 20. A typical clearance between an inner peripheral surface 26 and an outer peripheral surface 28 of each of the telescoping sections is in the range of 0.012 to 0.016 inches which is also sufficient to prevent entrapment of air. To accomplish locking engagement of the section 12B with the section 12A, the male end 28 includes an aperture 32 extending therethrough. The aperture 32 is positioned adjacent to a terminal end part of the male part 28 and dimensioned so as to permit alignment of the aperture 32 with the aperture 22 of the section 12A. Accordingly, the extended position of the section 12B, as illustrated in FIG. 1, is defined by the relative positions of the sections 12A and 12B when the apertures 22 and 32 are in registry.

To lock the male end 28 in engagement with the female end 20 and maintain the section 12B in the extended position, the locking assembly 14A is provided as seen in FIG. 5. The locking assembly 14A includes an end wall portion 34 and a mounting section 36 which are formed of a polymer or any other suitable material. The mounting section 36 is formed with an outer periphery 38 having a cross-sectional shape and outer dimension conforming in a close-fit relation to an inner peripheral surface 40 of the male end 28 so as to permit insertion of the mounting section 36 within the male end 28. To limit the extent of insertion of the mounting section 36 therein, the end wall portion 34 is dimensioned so as to form an annular flange 42 which extends radially outward so as to be flush with the outer periphery 30 of the mounting section 36. The annular flange 42 abuts against an end face 44 of the male end 28 when the locking assembly 14A is fully inserted therein to close off the male end 28.

To secure the locking assembly 14A within the inner periphery 40 of the male end 28, a securing pin 48 is provided which laterally extends through openings 50 provided in the wall of section 12B defining the male end 28. The locking assembly 14A is secured upon insertion of the pin 48 therethrough into an aligned aperture 52 within the locking assembly 14A, the opposing one of which is seen in FIG. 5. Upon insertion of the pin 48, the locking assembly 14 cannot be removed from the male end 28. To permit removal of pin 48 after being friction fitted in place, a cavity 49 may be formed in the locking assembly 14.

To lock the male end 28 with the female end 20 in the extended position, a spring biased button 54 seats within a pocket 56 formed within the locking assembly 14A. To engage the male end 28 with the female end 20 when the apertures 22 and 32 are in registry, the button 54 has an outer peripheral dimension and shape which is substantially identical to the peripheral dimensions and shape of the apertures 22 and 32 such that the button 54 extends therethrough and prevents relative movement of the adjacent sections 12A and 12B.

To maintain the button 54 in an extended locking position illustrated in FIG. 3, a spring 58 is retained between a spring seat 60 in the pocket 56 and an opposing spring seat 62 formed on the button 54. To keep the button 54 within the pocket 56 when the locking assembly 14 is secured within the male end 28, outwardly extending flanges 64 illustrated in FIG. 5 are provided on the button 54. The flanges 64 are stepped so as to contact the inner periphery 40 of the male end 28 when the button 54 is extended as seen in FIG. 3.

To disengage the button 54 from the apertures 22 and 32 and permit removal and/or relative telescoping sliding of the male end 28 with respect to the female end 20, the pocket 54 is formed with sufficient depth such that a user may actuate the button 54 to a fully depressed position (not illustrated). During sliding of section 12B, the button 54 remains in the depressed position either until the apertures 22 and 32 are in registry and the button 54 is biased upwardly by the spring 58 or until the section 12B is removed completely from section 12A.

Since section 12B may be readily removed from section 12A by depressing the button 54 and sliding section 12B longitudinally outwardly of the opening 21 of the female end 20, removal does not require backing the section 12B out of section 12A and the first section 12A only requires an end cap 66 as illustrated in FIG. 1 which does not have to be readily removable. This end cap 66 may be constructed of any type of flexible material such as a flexible plastic or the like which friction fits over the end thereof. This construction is preferable since the end cap 66 may be removed without tools and additional sections 12 can then be added.

It should be recognized that the intermediate sections 12B–12D between the end sections 12A and 12E are provided with both the male end 28 and the female end 20 at opposing ends thereof. Each section 12 may be readily disengaged from a respective adjacent section 12 to vary the overall length of the pole 10.

To secure a tool to the telescoping hot stick 10, the extremity 18 is provided with the tool holder 16 as illustrated generally in FIG. 1 and more specifically in FIG. 6. The tool holder 16 preferably is formed as what is commonly referred to as a universal head. The universal head 16 typically includes a circular section 68 with a plurality of teeth 70 which are adapted to receive corresponding tools (not illustrated). The tools (not illustrated) are held in position by an externally threaded bolt 72 which is in threaded engagement with an internally threaded aperture 74. Such a construction for the universal head 16 is known to the skilled artisan and, therefore, does not require a more detailed discussion.

The universal head 16 also includes restraining means such as a captive spring washer 75 to provide an axial biasing force when the tool (not illustrated) is secured by the bolt 72 and to thereby keep the tool from working free and damaging the teeth 70. Preferably the washer 75 is substantially concave. The axial biasing force increases as the bolt 72 is threaded farther into the aperture against the washer 75 and acts on the bolt 72 such that the external threads of the bolt 72 are pressing against the internal threads of the aperture 74 and rotation of the bolt 72 is frictionally restrained thereby. The universal head 16 also may be formed as a female fitting so as to fit over the outer periphery of the extremity 18.

In a high voltage electrical environment, the section 12E, which forms the extremity 18 of the pole 10, preferably is filled with a foam core (not illustrated) of known material. The foam core should be of unicellular construction so as to prevent the ingress of moisture or any other electrically degrading contaminant. To increase the visibility of the extremity 18, the section 12E preferably is provided with a high-visibility fluorescent color.

In operation, a selected tool (not illustrated) is secured to the tool holder 16. Section 12E thereafter is slid relative to section 12D to its extended position at which time the locking assembly 14D engages the adjacent sections 12D and 12E. Each successive section 12 is similarly slid to the extended position thereof to provide the desired overall length of the pole 10 as seen in FIG. 1.

A user grasps the telescoped hot stick 10 and manipulates the tool (not illustrated) from a position a selected distance away from a workpiece (not illustrated). The sections 12A–12E are maintained in extended engagement by the locking assemblies 14A–14D during operation. To facilitate transportation or storage of the telescoping hot stick 10 after use, the locking assemblies 14 each may be selectively disengaged and the respective sections 12A–12D collapsed one within the other as illustrated by FIGS. 2 and 4.

In particular, as seen in FIGS. 3 and 5 with respect to sections 12A and 12B, when the apertures 22 and 32 are in registry, the button 54 is biased by the spring 58 to the extended position. When extended, the button 54 engages and restrains the female end 20 and male end 28 of respective sections 12A and 12B.

Since the distance between the user and the workpiece (not illustrated) may vary, it may be desirable to shorten the overall length of the pole 10. Shortening preferably is accomplished by removing unneeded sections 12 to provide an optimum length.

A section 12 or group of sections 12 may be readily removed by actuating the appropriate button 54 to its depressed position and sliding the male end 28 from the female end 20. As many sections 12 may be removed as is necessary or even added if longer lengths are needed.

Such an arrangement provides a definite advantage over previous telescopic poles 10'. One construction for previously used poles 10' is seen in FIG. 7. Such poles 10' incorporate a reduced diameter portion 76 of a first section 12A' which forms an interior annular rim 78. The locking assembly 14' of the second section 12B' includes an end wall portion 34' having an outer annular flange 80 extending radially outwardly beyond an outer periphery 30' of the second section 12B'. The outer annular flange 80 is formed so as to engage the interior annular rim 78 of the first section 12A' and prevent removal of the second section 12B' therefrom. Such an arrangement facilitates engagement of the locking assembly 14' with an aperture 22' whereupon the second section 12B' is slid to the extended position such that the outer annular flange 80 abuts against the interior annular rim 78.

To lock the second section 12B' in the extended position, the second section 12B' is rotated until a button 54' of the locking assembly 14' is in registry with the aperture 22' of the first section 12A' and engages the aperture 22'. Sections 12A' and 12B' have a circular cross-sectional shape and, therefore, rotation is required for locking. Once locked, torsional load on the pole 10' is transmitted to the button 54'.

Construction of such prior art arrangement requires inserting the second section 12B' through an open end 82 of the first section 12A' opposite the reduced diameter portion 76. To prevent the second section 12B' from falling out of the first section 12A', a threaded end cap 84 is secured on the open end 82 or in the case of intermediate sections 12' of the pole 10' the button assembly 14' is secured in the male end 28' to prevent removal. As a result, construction requires sequentially inserting and then securing each section 12 within an adjacent section 12.

A further advantage of the inventive pole 10 is that rotative forces applied to the pole by the user are transmitted from section to section independent of the button 54 being received in registered apertures 22 and 32 due to the operative non-circular configuration of each section and the close interfitting relation between each of the sections. Further, the transfer of rotative forces is independent of the extent that each section projects from the next adjacent section. As a result, no rotative forces are transmitted from section to section through the button 54.

Although a particular preferred embodiment of the invention has been disclosed in detail for illustrative purposes which is an improvement over known constructions, it will be recognized that variations or modifications of the disclosed apparatus of the invention, including the rearrangement of parts, lie within the scope of the present invention.

The embodiments of the invention in which an exclusive property or privilege is claimed are defined as follows:

1. A telescoping pole for manipulating a tool from a position a selected distance away from a workpiece, said pole having an extremity with means for connecting the tool thereto and further comprising:

a tubular first section having a female end and a predetermined non-circular cross-sectional shape defined by a plurality of first side portions and a plurality of convex first arcuate portions, each mutually adjacent pair of said first side portions having one of said first arcuate portions disposed therebetween, said first section being formed of a dielectric material and including an interior which defines an axial path;

a second section being formed of a dielectric material and having a male end slidably engaged within said interior of said first section through said female end, said second section having a predetermined non-circular cross-sectional shape corresponding to said shape of said first section which said cross-sectional shape of said second section is defined by a plurality of second side portions and a plurality of convex second arcuate portions, each mutually adjacent pair of said second side portions having one of said first arcuate portions disposed therebetween, each said second arcuate portion aligned in a facing relation with a respective one of said first arcuate portions when said first and second sections are engaged together so as to prevent rotation of said second section relative to said first section when engaged therein while being slidable along said axial path; and cooperating locking means between said first and second sections for releasably restraining said male end within said first section proximate said female end to maintain said second section in an extended position, said locking means being engagable so as to restrain said second section relative to said first section to prevent said sliding of said second section and being releasable so as to permit said sliding.

2. The telescoping pole as defined in claim 1, comprising a plurality of said sections arranged adjacent one with the other between a base end and said extremity, each pair of said adjacent sections formed so as to cooperate as first and second sections and permit ready disengagement and removal of any of said adjacent sections located intermediate a base end of said telescoping pole and said extremity.

3. The telescoping pole as defined in claim 1, wherein said first section has a base end opposite said female end and an end cap enclosing said base end which is removable without tools to permit the insertion of additional sections to lengthen said telescoping pole.

4. The telescoping pole as defined in claim 1, wherein said locking means comprises a first aperture extending through said first section proximate said female end, and means defining an end wall of said male end which includes a mounting section disposed within an interior of said male end and having an outer periphery corresponding to an inner periphery of said second section, said mounting section including means defining a pocket, a spring-biased button seated within said pocket and movable between a depressed position contained within said pocket and an extended position protruding through a second aperture of said second section proximate said male end, and holding means for securing said end wall means to said male end, said button including a stepped flange for abutment against said interior periphery to define said extended position of said button, said button actuated to said extended position through said first aperture by movement of said second section only along said axial path until said button is in registry with said first aperture.

5. The telescoping pole as defined in claim 1, wherein said interior has an interior surface which is uniform about a periphery thereof which is defined by said first side portions and said first arcuate portions, said locking means being actuated to releasably restrain said first and second sections in response to a sliding of said second section to said extended position only along said axial path.

6. The telescoping pole as defined in claim 5, wherein said cross-sectional shape of said second section is uniform along an axial length thereof to permit ready removal of said second section from said first section upon release of said locking means.

7. The telescoping pole as defined in claim 6, wherein said cross-sectional shape of said first and second sections is substantially triangular.

8. A telescoping pole for manipulating a tool from a position a selected distance away from a workpiece, said pole having an extremity with means for connecting the tool thereto and further comprising:

a tubular first section having a female end and a predetermined non-circular cross-sectional shape, said first section including an interior which defines an axial path;

a second section having a male end slidably engaged within said interior of said first section through said female end, said second section having a predetermined non-circular cross-sectional shape corresponding to said shape of said first section to prevent rotation of said second section relative to said first section when engaged therein and being slidable along said axial path;

cooperating locking means between said first and second sections for releasably restraining said male end within said first section proximate said female end to maintain said second section in an extended position; and said means for connecting the tool comprising an engagement member mounted to said extremity and a threaded securing member, said engagement member having an aperture therethrough adapted to threadingly engage said securing member to secure said tool thereon, said telescoping pole further including a biasing washer in communication with said securing member and adapted to provide a locking biasing force acting on said securing member upon threaded engagement thereof when securing said tool.

9. A telescoping pole for manipulating a tool from a position a selected distance away from a workpiece, said pole having an extremity with means for connecting the tool thereto and further comprising:

a tubular first section having a female end and a predetermined non-circular cross-sectional shape, said first section including an interior which defines an axial path and has an interior surface which is uniform about a periphery thereof;

a second section having a male end slidably engaged within said interior of said first section through said female end, said second section having a predetermined non-circular cross-sectional shape corresponding to said shape of said first section to prevent rotation of said second section relative to said first section when engaged therein and being slidable along said axial path; and cooperating locking means between said first and second sections for releasably restraining said male end within said first section proximate said female end to maintain said second section in an extended position, said locking means being actuated to releasably restrain said first and second sections in response to a sliding of said second section to said extended position only along said axial path, said locking means including a button which restrains said second section when said button is engaged with said first section and which permits removal of said second section when said button is actuated to a disengaged position, said second section being free of any constructions inhibiting removal from said first section upon disengagement of said locking means.

10. The telescoping pole as defined in claim 9, wherein said cross-sectional shapes of said first and second sections are dimensioned so as to prevent relative rotation of said sections when said button is both engaged and disengaged.

11. A telescoping pole for manipulating a tool from a position a selected distance away from a workpiece, said pole having an extremity with means for connecting the tool thereto and further comprising:

a tubular first section having a female end and a predetermined non-circular cross-sectional shape, said first section including an interior which defines an axial path;

a second section having a male end slidably engaged within said interior of said first section through said female end, said second section having a predetermined non-circular cross-sectional shape corresponding to said shape of said first section to prevent rotation of said second section relative to said first section when engaged therein and being slidable along said axial path, said second section forming said extremity and having an outer peripheral surface formed with a fluorescent high visibility material; and cooperating locking means between said first and second sections for releasably restraining said male end within said first section proximate said female end to maintain said second section in an extended position.

12. A telescoping pole for manipulating a tool from a position a selected distance away from a workpiece, said pole having an extremity with means for connecting the tool thereto and further comprising:

a tubular first section having a female end and a predetermined substantially triangular cross-sectional shape, said first section including an interior which defines an axial path, said interior having an interior surface which is uniform about a periphery thereof;

a second section having a male end slidably engaged within said interior of said first section through said female end, said second section having a predetermined substantially triangular cross-sectional shape corresponding to said shape of said first section to prevent rotation of said second section relative to said first section when engaged therein and being slidable along said axial path, said cross-sectional shape of said second section being uniform along an axial length thereof so as to permit ready removal of said second section from said first section; and cooperating locking means between said first and second sections for releasably restraining said male end within said first section proximate said female end to maintain said second section in an extended position, said locking means being actuated to releasably restrain said first and second sections in response to a sliding of said second section to said extended position only along said axial path, said second section being removable from said first section upon release of said locking means.

13. The telescoping pole as defined in claim 12, wherein said locking means comprises an aperture extending through said first section proximate said female end, and a button assembly secured to said second section proximate said male end, said button assembly having a protruding button movable between a depressed position to permit sliding of said second section within said first section and an extended position for engaging said aperture when said button and aperture are in registry.

14. A telescoping pole for manipulating a tool from a position a selected distance away from a workpiece, said pole having an extremity with means for connecting the tool thereto and further comprising:

a tubular first section having a female end and a predetermined non-circular cross-sectional shape, said first section being formed of a dielectric material and having a hollow interior extending along a longitudinal axis thereof to define an axial path, said cross-sectional shape being defined by a plurality of longitudinally extending first side portions and a plurality of longitudinally extending convex first arcuate portions, each mutually adjacent pair of said first side portions having one of said first arcuate portions disposed therebetween;

a second section being formed of a dielectric material and having a male end which is slidably received within said hollow interior of said first section through said female end and has an interior periphery which defines a hollow interior, said second section having a predetermined non-circular cross-sectional shape corresponding to said shape of said first section which said cross-sectional shape of said second section is defined by a plurality of longitudinally extending second side portions and a plurality of longitudinally extending convex second arcuate portions, each mutually adjacent pair of said second side portions having one of said first arcuate portions disposed therebetween, each said second arcuate portion aligned in a closely facing relation with a respective one of said first arcuate portions when said first and second sections are engaged together so as to prevent rotation of said second section relative to said first section when engaged therein, said second section being free of any constructions which inhibit sliding within said interior of said first section along said axial path and removal from said female end thereof; and cooperating locking means between said first and second sections for releasably restraining said male end within said first section proximate said female end to maintain said second section in an extended position, said locking means comprising a first aperture extending through said first section proximate said female end, and a button assembly secured within said hollow interior of said second section, said button assembly having a protruding button movable between a depressed position to permit sliding of said second section within said first section and an extended position for engaging said first aperture when said button and said first aperture are in registry, said button being aligned in registry with said first aperture in response to movement of said second section only along said axial path.

15. The telescoping pole as defined in claim 14, comprising a plurality of said sections arranged adjacent one with the other between a base end and said extremity, each pair of adjacent sections formed so as to cooperate as first and second sections and permit ready disengagement and removal of any of said adjacent sections located intermediate said base end and said extremity.

16. A telescoping pole for manipulating a tool from a position a selected distance away from a workpiece, said pole having an extremity with means for connecting the tool thereto and further comprising:

a tubular first section having a female end and a predetermined non-circular cross-sectional shape, said first section having a hollow interior extending along a longitudinal axis thereof to define an axial path;

a second section having a male end which is slidably received within said hollow interior of said first section through said female end and has an interior periphery which defines a hollow interior, said second section having a predetermined non-circular cross-sectional shape corresponding to said shape of said first section to prevent rotation of said second section relative to said first section when engaged therein, said second section being free of any constructions which inhibit sliding within said interior of said first section along said axial path and removal from said female end thereof, said second section forming said extremity and has an outer peripheral surface formed with a fluorescent high visibility material; and cooperating locking means between said first and second sections for releasably restraining said male end within said first section proximate said female end to maintain said second section in an extended position, said locking means comprising a first aperture extending through said first section proximate said female end, and a button assembly secured within said hollow interior of said second section, said button assembly having a protruding button movable between a depressed position to permit sliding of said second section within said first section and an extended position for engaging said first aperture when said button and said first aperture are in registry, said button being aligned in registry with said first aperture in response to movement of said second section only along said axial path.

17. A telescoping pole for manipulating a tool from a position a selected distance away from a workpiece, said pole having an extremity with means for connecting the tool thereto and further comprising:

a tubular first section having a female end and a predetermined non-circular cross-sectional shape, said first section having a hollow interior extending along a longitudinal axis thereof to define an axial path;

a second section having a male end which is slidably received within said hollow interior of said first section through said female end and has an interior periphery which defines a hollow interior, said second section having a predetermined non-circular cross-sectional shape corresponding to said shape of said first section to prevent rotation of said second section relative to said first section when engaged therein, said second section being free of any constructions which inhibit sliding within said interior of said first section along said axial path and removal from said female end thereof;

cooperating locking means between said first and second sections for releasably restraining said male end within said first section proximate said female end to maintain said second section in an extended position, said locking means comprising a first aperture extending through said first section proximate said female end, and a button assembly secured within said hollow interior of said second section, said button assembly having a protruding button movable between a depressed position to permit sliding of said second section within said first section and an extended position for engaging said first aperture when said button and said first aperture are in registry, said button being aligned in registry with said first aperture in response to movement of said second section only along said axial path; and said means for connecting the tool comprising an engagement member mounted to said extremity and a threaded securing member, said engagement member having an aperture therethrough adapted to threadingly engage said securing member to secure said tool thereon, said telescoping pole further including a biasing washer in communication with said securing member and adapted to provide a locking biasing force acting on said securing member upon threaded engagement thereof when securing said tool.

18. A telescoping pole for manipulating a tool from a position a selected distance away from a workpiece, said pole having an extremity with means for connecting the tool thereto and further comprising:

a tubular first section having a female end and a predetermined substantially triangular cross-sectional shape defined by three side surfaces, said first section having a hollow interior extending along a longitudinal axis thereof to define an axial path;

a second section having a male end which is slidably received within said hollow interior of said first section through said female end and has an interior periphery which defines a hollow interior, said second section having a predetermined substantially triangular cross-sectional shape corresponding to said shape of said first section and defined by three side surfaces to prevent rotation of said second section relative to said first section when engaged therein, said second section being free of any constructions which inhibit sliding within said interior of said first section along said axial path and removal from said female end thereof; and cooperating locking means between said first and second sections for releasably restraining said male end within said first section proximate said female end to maintain said second section in an extended position, said locking means comprising a first aperture extending through one of said side surfaces of said first section proximate said female end, and a button assembly secured within said hollow interior of said second section, said button assembly having a protruding button movable between a depressed position to permit sliding of said second section within said first section and an extended position for engaging said first aperture when said button and said first aperture are in registry, said button being aligned in registry with said first aperture in response to movement of said second section only along said axial path, said button assembly further including means defining a pocket, said button seated within said pocket and movable between said depressed position contained within said pocket and said extended position protruding through a second aperture in one of said side surfaces of said second section, and holding means for securing said button assembly to said male end, said button including a stepped flange for abutment against said interior periphery to define said extended position of said button.

19. The telescoping pole as defined in claim 18, wherein said button releasably restrains said first section when extended through said first aperture, said button being rectangular and having a width proximate a width of said side surface.

20. The telescoping pole as defined in claim 19, wherein said cross-sectional shape of at least said second section is uniform along an axial length thereof to permit ready removal of said second section from said first section upon release of said locking means.

\* \* \* \* \*